N. SINCLAIR

May 17, 1932. FOLDING BED Re. 18,469

2 Sheets-Sheet 1

Original Filed March 27, 1924

Inventor
Neil Sinclair
By
Miller, Hury & Boykin
Attorneys

N. SINCLAIR

May 17, 1932. FOLDING BED Re. 18,469

2 Sheets-Sheet 2

Original Filed March 27, 1924

Inventor
Neil Sinclair

By Miller Henry & Boykin

Attorneys

Reissued May 17, 1932

Re. 18,469

UNITED STATES PATENT OFFICE

NEIL SINCLAIR, OF OAKLAND, CALIFORNIA, ASSIGNOR TO RIP VAN WINKLE WALL BED COMPANY, INC., OF OAKLAND, CALIFORNIA, A CORPORATION OF CALIFORNIA

FOLDING BED

Original No. 1,714,642, dated May 28, 1929, Serial No. 702,214, filed March 27, 1924. Application for reissue filed November 19, 1929. Serial No. 408,399.

My invention has for its object the combination of a bed, a wall and a receptacle, and supporting and operating connections therebetween whereby the bed may be swung from one side of the wall into the receptacle or may be withdrawn from the receptacle and positioned against the wall.

Other objects I accomplish by the employment of a plurality of pivoted means being mounted on one side of the receptacle and also upon the bed respectively, and connecting and supporting arms therebetween whereby the bed is pivoted about the ends of the arms and the arms are pivoted to the side of the receptacle.

By referring to the accompanying drawings and specifications my invention will be made clear.

Fig. 1 is a plan view showing the bed diagrammatically in the full closed position in the closet or receptacle.

Figs. 2 to 5 inclusive are similar to Fig. 1 with the bed in successive advanced positions as it is swung from the closet position of Fig. 1 to the fully opened position of Fig. 5, when the upended bed is fully in the room and ready to be let down.

Throughout the figures similar numerals refer to identical parts.

The wall of a room is shown by the numerals 1 and 2 respectively from which is opened a receptacle or closet 3 having inner walls 4, 5 and 6, respectively and preferably also a door 7 normally closing the said closet.

Figure 6:
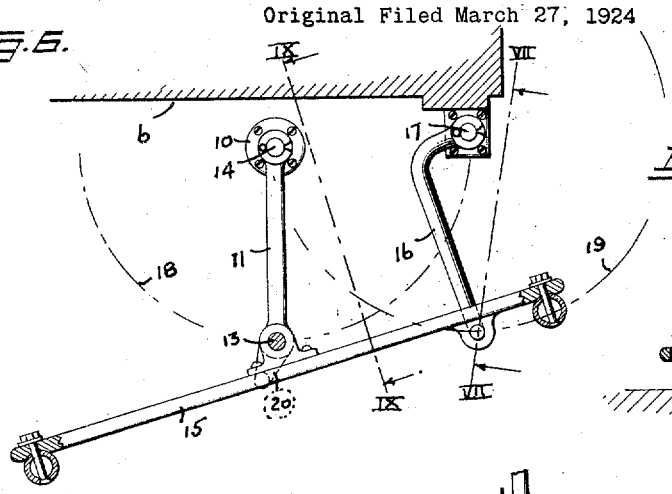
Fig. 6 is a plan view similar to Fig. 2 but with the parts shown somewhat more in detail.
Figure 7:
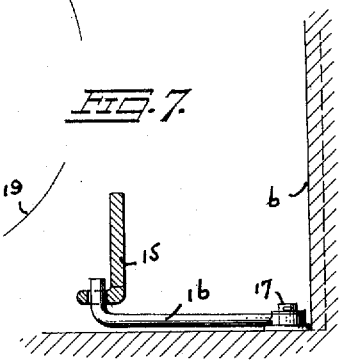
Fig. 7 is a side elevation of the lower pivot and the swinging arm and a portion of the bed frame, and is taken on the line VII—VII of Fig. 6.

Mounted either on or adjacent to the wall 6 is the pivot support 8 carrying the arm 9 and in line therewith a second pivot support 10 carrying the arm 11. These supporting arms are rigidly fixed to the connecting bar 13 thus forming virtually one arm or bracket and whereby they are caused to move in synchronism about the pivots 12 and 14. Pivoted on the bar 13 is the head piece 15 of a conventional folding bed. A spacing arm 16 pivoted at 17 adjacent to the wall 6 compels the movement of the bed member 15 as the arms 9 and 11 and rod 13 are swung about the pivots 12, 14. See Figs. 6, 7, 8.

Figure 3:
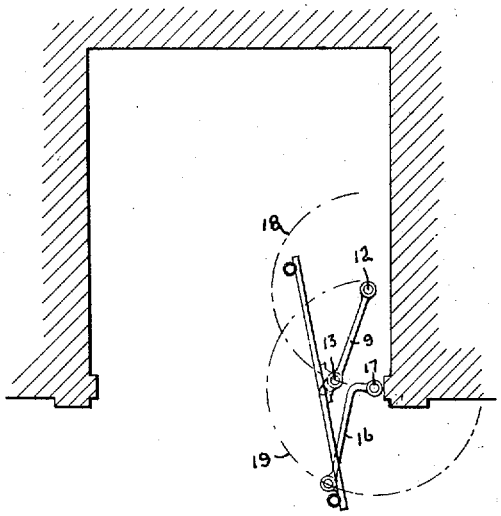

The path of movement of the rod 13 is shown by the arc 18, Fig. 3, and the arc described by the arm 16 is shown at 19.

Figure 1:
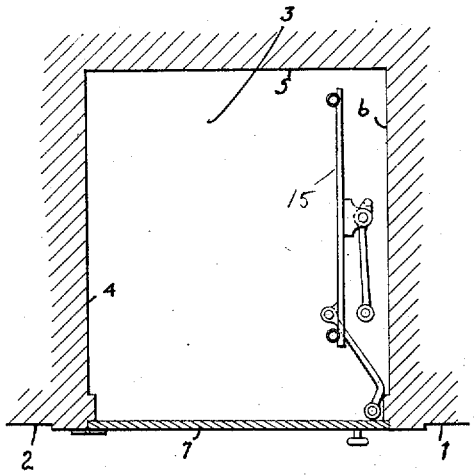
Figure 2:
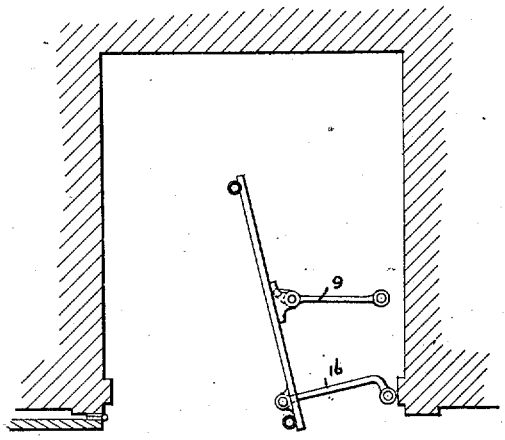
Figure 4:
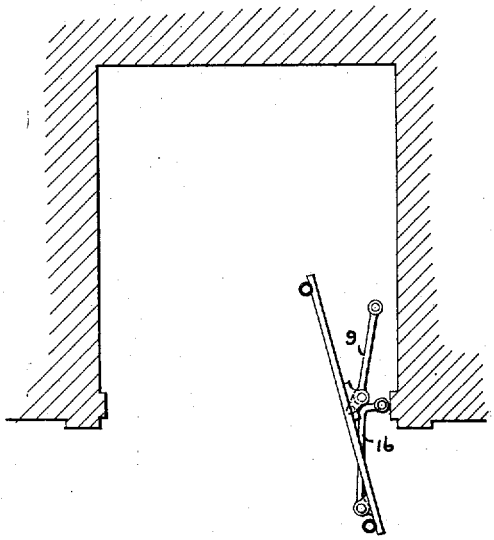
Figure 5:
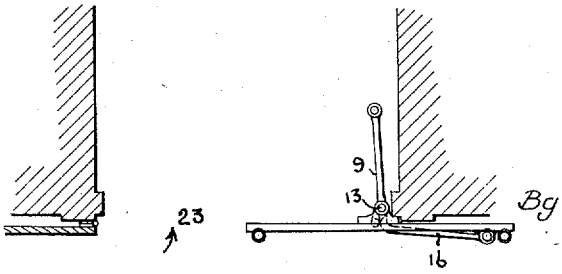

It will now be seen that as the bed swings from the position at Fig. 1 to the position of Fig. 3, the arms 9 and 16 move substantially through the same angle and that thereafter during the movement shown in Figs. 4 and 5 the arm 9 moves but slightly, whereas the arm 16 moves through substantially 90 degrees. There will therefore be a total movement of the arm 9 of substantially 180 degrees and of the arm 16 of 270 degrees, when the bed is shifted from the position of Fig. 1 to the position of Fig. 5.

To prevent the arms 9 and 11 and rod 13 becoming buckled upon the dead center when in line with pivot 17, I introduce the stop lug 20 integral with the rod 13, against which the arm 16 contacts. See Figs. 3, 5, 8. In the extreme position of Fig. 8 and when the bed is swung out in the direction of the arrow 21 towards its closing direction, the arm 16 through contacting with the lug 20, forces the rod 13 in a closing direction clear of pivot 17 and away from the dead center.

In place of the lug 20 the arms and parts may be so proportioned that instead of the rod 13 arriving over the dead center of pivot 17, its final position may be just outside thereof, thus insuring its returning movement clear of the dead center when the bed is swung in the direction 21.

Figure 8:
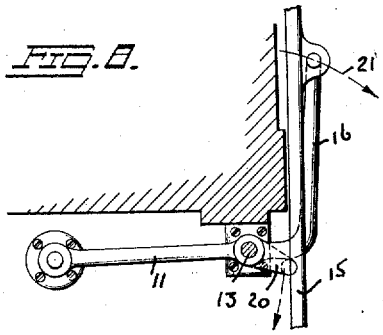
Fig. 8 is similar to Fig. 6 with the bed fully swung into the room corresponding with the position shown in Fig. 5.
Figure 9:
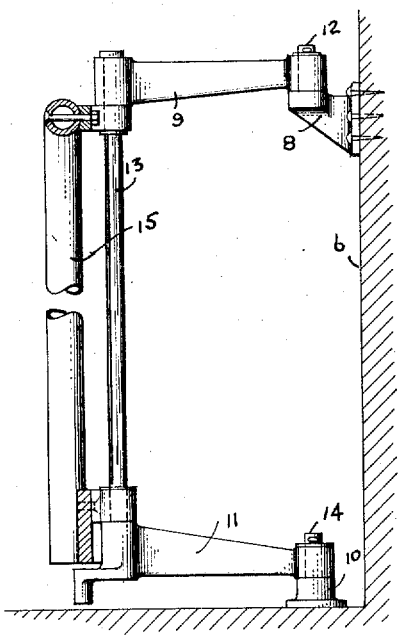
Fig. 9 is a side view taken on the line IX—IX of Fig. 6.
Figure 10:
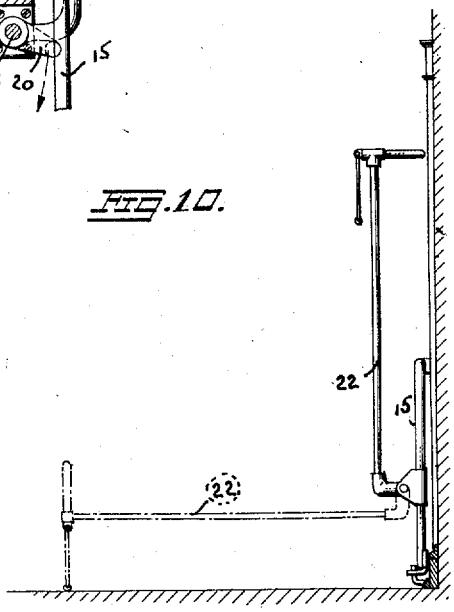
Fig. 10 is a side view of the bed in its upended position when fully swung into the room in accordance with Figs. 5 and 8 and also shows the bed when swung down into final position in dotted lines from the upended position in full lines.

When the bed arrives at the final position of Figs. 5, 8 and 10, the folding portion 22 is turned down, shown by dotted lines in Fig. 10, thus making the bed available for use in the room. When the bed is swung entirely into the closet or receptacle 3 as shown in Fig. 1, the door 7 is closed, totally obscuring closet and bed contained therein. The closet walls 4 and 5 are always accessible regardless of whether the bed is in the position of Fig. 1, or Fig. 5 or any of the intermediate positions, access being readily attained as through the space indicated by the arrow 23, Fig. 5.

I claim:

1. A wall bed mounting comprising a pair of horizontally disposed supporting arms vertically pivoted at one end each to a fixed point adjacent a closet side wall and pivotally supporting the bed at the other ends adapting the bed to swing outwardly from a position within the closet substantially parallel and adjacent to said side wall to an out position at right angles therewith extending beyond said side wall substantially half the width of the bed, and a guiding arm pivoted at one end to a point in the closet adjacent said side wall forwardly of said supporting arms and at its other end to the bed insuring such movement of the bed upon swinging of the same and formed to entirely clear and overlap the outer corner of said wall in the out position of the bed.

2. A wall bed mounting comprising a pair of horizontally disposed supporting arms vertically pivoted at one end each to a fixed point adjacent a closet side wall and pivotally supporting the bed at the other ends adapting the bed to swing outwardly from a position within the closet substantially parallel and adjacent to said side wall to an out position at right angles therewith extending beyond said side wall substantially half the width of the bed, and a guiding arm pivoted at one end to a point in the closet adjacent said side wall forwardly of said supporting arm and at its other end to the bed insuring such movement of the bed upon swinging of the same and said guiding arm being provided with a relatively short offset inner end whereby its fixed pivotal point is kept within the closet adjacent the outer corner of the wall with the arm entirely clearing the corner of the wall when the bed is in out position and the main body of the arm extends substantially at right angles away from the closet.

3. In a structure as specified in claim 1 one of said supporting arms being arranged to contact said guiding arm in the out position of the bed for limiting the relative movement of the arms.

4. In a structure as specified in claim 1 all of said arms being positioned between the bed and wall and pivoted at points lying within the outer corner of the wall.

5. A wall bed mounting comprising a horizontally disposed supporting arm vertically pivoted at one end to a fixed point adjacent a closet side wall and pivotally supporting the bed at the other end adapting the bed to swing outwardly from a position within the closet substantially parallel and adjacent to said side wall to an out position at right angles therewith extending beyond said side wall substantially half the width of the bed, and a guiding arm pivoted at one end to a point in the closet adjacent said side wall forwardly of said supporting arm and at its other end to the bed insuring such movement of the bed upon swinging the same forward to entirely clear and overlap the outer corner of said wall in the out position of the bed.

6. A wall bed mounting comprising a supporting bracket vertically pivoted at one end on a fixed axis adjacent a closet side wall and pivotally supporting the bed at the other end adapting the bed to swing outwardly from a position within the closet substantially parallel with and adjacent to said side wall to an out position at right angles therewith extending beyond said side wall substantially half the width of the bed, and a bent guiding arm positioned adjacent said side wall pivoted at one end to the bed and at the other end to a fixed point within the closet forwardly of said fixed axis insuring such movement of the bed and clearing the outer corner of said wall in the out position of the bed.

7. A wall bed mounting comprising a horizontally disposed supporting arm vertically pivoted at one end to a point adjacent a closet side wall and pivotally supporting the bed at the other end adapting the bed to swing outwardly from a position within the closet substantially parallel with and adjacent said side wall, to an out position at right angles therewith extending beyond said side wall substantially half the width of the bed, and a guiding arm pivoted at one end to a point within the closet adjacent said side wall forwardly of said supporting arm and at its other end pivotally connected to the bed insuring such movement of the bed upon swinging the same, said guiding arm arranged to clear the outer corner of said wall in the out position of the bed.

In testimony whereof I have hereunto set my hand this 15th day of November, 1929.

NEIL SINCLAIR.